(12) United States Patent
Redlich

(10) Patent No.: US 6,495,996 B1
(45) Date of Patent: Dec. 17, 2002

(54) LINEAR MOTOR CONTROL WITH TRIAC AND PHASE LOCKED LOOP

(76) Inventor: Robert Walter Redlich, 9 Grand Park Blvd., Athens, OH (US) 45701

( * ) Notice: Subject to any disclaimer, the term of this patent is extended or adjusted under 35 U.S.C. 154(b) by 0 days.

(21) Appl. No.: 10/016,755

(22) Filed: Oct. 31, 2001

(51) Int. Cl.⁷ .................................................. G05F 5/00
(52) U.S. Cl. ......................................... 323/300; 323/303
(58) Field of Search ................................ 323/273, 275, 323/279, 280, 300, 303; 318/135, 687

(56) References Cited

U.S. PATENT DOCUMENTS

| | | | |
|---|---|---|---|
| 4,348,625 A | * 9/1982 | Sharp | 318/757 |
| 4,355,242 A | * 10/1982 | Lezan et al. | 307/252 |
| 4,358,729 A | * 11/1982 | Hart | 323/322 |
| 4,387,329 A | * 6/1983 | Harlow | 318/729 |
| 4,602,174 A | 7/1986 | Redlich | |
| 5,496,153 A | 3/1996 | Redlich | |
| 5,592,073 A | 1/1997 | Redlich | |

OTHER PUBLICATIONS

Data Sheet for Integrated Circuit Type CD4046B, published by Texas Instruments, 1992.

* cited by examiner

Primary Examiner—Matthew Nguyen
(74) Attorney, Agent, or Firm—Frank H. Foster; Kremblas, Foster, Phillips & Pollick

(57) ABSTRACT

A Triac and a phase-locked loop are used to control the amplitude of reciprocation of an AC linear motor. The phase locked loop generates a square wave that is synchronized with an AC power source but is substantially isolated from electrical noise on the power source. The phase of the square wave is varied with an amplitude control signal, and Triac firing pulses are generated at the transitions of the square wave.

3 Claims, 5 Drawing Sheets

LINEAR MOTOR CONTROL WITH TRIAC AND PHASE LOCKED LOOP

TECHNICAL FIELD

The invention is in the general field of electric motor control. Specifically, the invention uses a Triac and a phase locked loop to control the amplitude of reciprocation of a linear motion AC motor, in such a way that pulses of power line noise have little effect on amplitude or phase of reciprocation.

BACKGROUND ART

Triac controllers (Ref. 2) offer an inexpensive means of controlling reciprocation amplitude of linear motion AC motors (Ref. 1), but in prior art have the disadvantage of responding to pulses of electrical noise on the AC power line if peak pulse voltage is high enough to cause the power line voltage to cross zero volts. A spurious zero crossing is treated by the prior art control as a normal zero crossing, and, since prior art Triac control generates Triac firing pulses that are timed relative to zero crossings of power line voltage, the result of a pulse of line noise can be generation of a spurious Triac firing pulse. If the linear motor drives a free piston machine such as a Stirling refrigerator, incorrectly timed Triac firing can cause damage to the machine and/or loss of amplitude control. Electrical filtering of line voltage can attenuate line noise, but suppression by filtering of pulses of line noise occurring very near normal zero crossings, to the point where a spurious zero crossing cannot occur, is impractical.

BRIEF DISCLOSURE OF INVENTION

The invention uses a Triac and a phase locked loop to control the amplitude of reciprocation of a linear motor with substantial isolation from disturbance by line noise pulses. Amplitude control in the invention is achieved, as in prior art, by connecting the series combination of the motor and a Triac across an AC power source, and varying the phase of Triac firing pulses relative to the power source voltage. The invention departs from prior art in that firing pulses are generated at transitions of the square wave output of a Voltage Controlled Oscillator (VCO) that is part of a phase locked loop (PLL). The VCO is synchronized in frequency with the AC power source by the PLL, but is practically isolated from power line noise pulses. In the invention, the phase of the VCO output and therefore of the Triac firing pulses, relative to line voltage, is varied with a control voltage that is proportional to the difference between a first voltage proportional to an "amplitude set-point" voltage and a second voltage that is proportional to a measured value of reciprocation amplitude. A decrease in measured amplitude causes a leading phase shift of firing pulses, which constitutes negative feedback that acts to hold the amplitude of reciprocation of the motor at a preset value determined by the amplitude set point voltage.

In one form of the invention, a voltage proportional to the amplitude of reciprocation of the linear motor is derived by analog or digital computation based on the equivalent circuit of the linear motor, thus obviating the cost and complexity of a position sensor.

The basic components of the phase locked loop used in the invention can be elements of a single integrated circuit (e.g., type 4046, see Ref 4).

DETAILED DESCRIPTION

Figure 1:
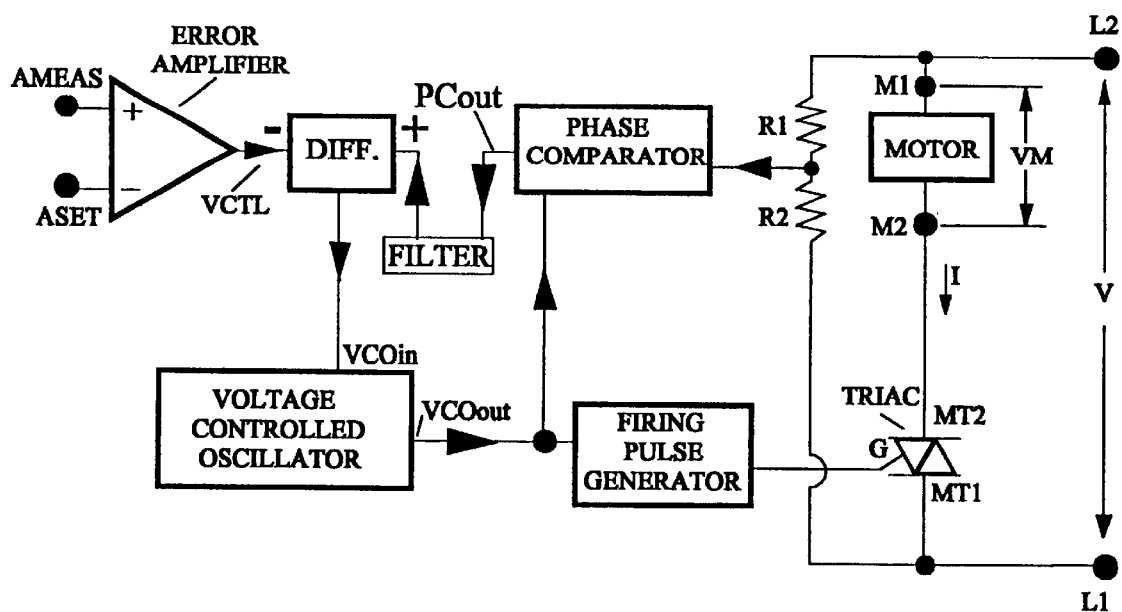
FIG. 1 is a block diagram of the invention.

Referring to FIG. 1, a linear motor (MOTOR) with terminals M1 and M2 and a Triac with main terminals MT1 and MT2 and a gate terminal G are connected in series across an AC power line whose terminals are L1 and L2. Firing pulses applied to G cause the Triac to become practically a short circuit so that line voltage (V) is applied across the motor. After firing, the Triac remains a short circuit until current (I) falls to zero, whereupon the Triac becomes practically an open circuit and awaits the next firing pulse. Control of the reciprocation amplitude of the motor is achieved in the invention by controlling the time of occurrence of firing pulses relative to zero crossings of V. If firing pulses precede zero crossings of V by a time that is short relative to the period of V, the Triac remains a short circuit for only a small part of the AC cycle, and motor amplitude is small. As the time between a firing pulse and the next zero crossing of V increases, i.e., as firing pulses increasingly lead V in phase, the Triac remains a short circuit for a greater fraction of the AC cycle and motor amplitude increases.

In the invention, firing pulses are generated at the transitions of a square wave that is synchronized in frequency with line voltage V, and whose phase relative to V can be varied with a control voltage VCTL. Isolation from the effects of pulses of electrical noise on the power line is achieved in the invention by using a phase locked loop to generate the square wave from which firing pulses are derived, as will now be described.

Referring to FIG. 1, a resistive voltage divider (R1, R2) is connected across L1 and L2. The attenuated replica of power line voltage that appears at the node joining R1 and R2 is a first input to a PHASE COMPARATOR whose second input is the output of a VOLTAGE CONTROLLED OSCILLATOR (VCO). The VCO output (designated VCOout) is a square wave whose frequency is determined by the VCO input (designated VCOin). The output of the PHASE COMPARATOR (PCout) is low pass filtered by FILTER and applied to a difference amplifier (designated DIFF) which subtracts a control voltage VCTL from the filtered PCout and applies the difference to VCOin according to the equation $$VCOin = (\text{filtered } PCout - VCTL),$$

thus forming a closed phase locked loop (PLL). As is known in prior art, such a PLL will synchronize the two inputs to the PHASE COMPARATOR, that is, the PLL causes VCOout to have the same frequency as the AC power line. Since there is a unique relationship between VCOin and the frequency of VCOout, it follows that VCOin remains constant regardless of VCTL, i.e., $$\text{filtered } (PCout) = K1 + VCTL \quad \text{equation 1}$$

where K1=constant value of VCOin.

In the invention, the PHASE COMPARATOR is of the Exclusive-OR (X-OR) type, for which $$\text{filtered } (PCout) = K2 \times (\text{phase lag of } VCOout \text{ relative to AC line}) \quad \text{equation 2}$$

where K2 is a constant. Combining equations 1 and 2 gives, $$\text{phase lag of } VCO \text{ out relative to } AC \text{ line} = (1/K2) \times (K1 + VCTL) \quad \text{equation 3}$$

Figure 4:
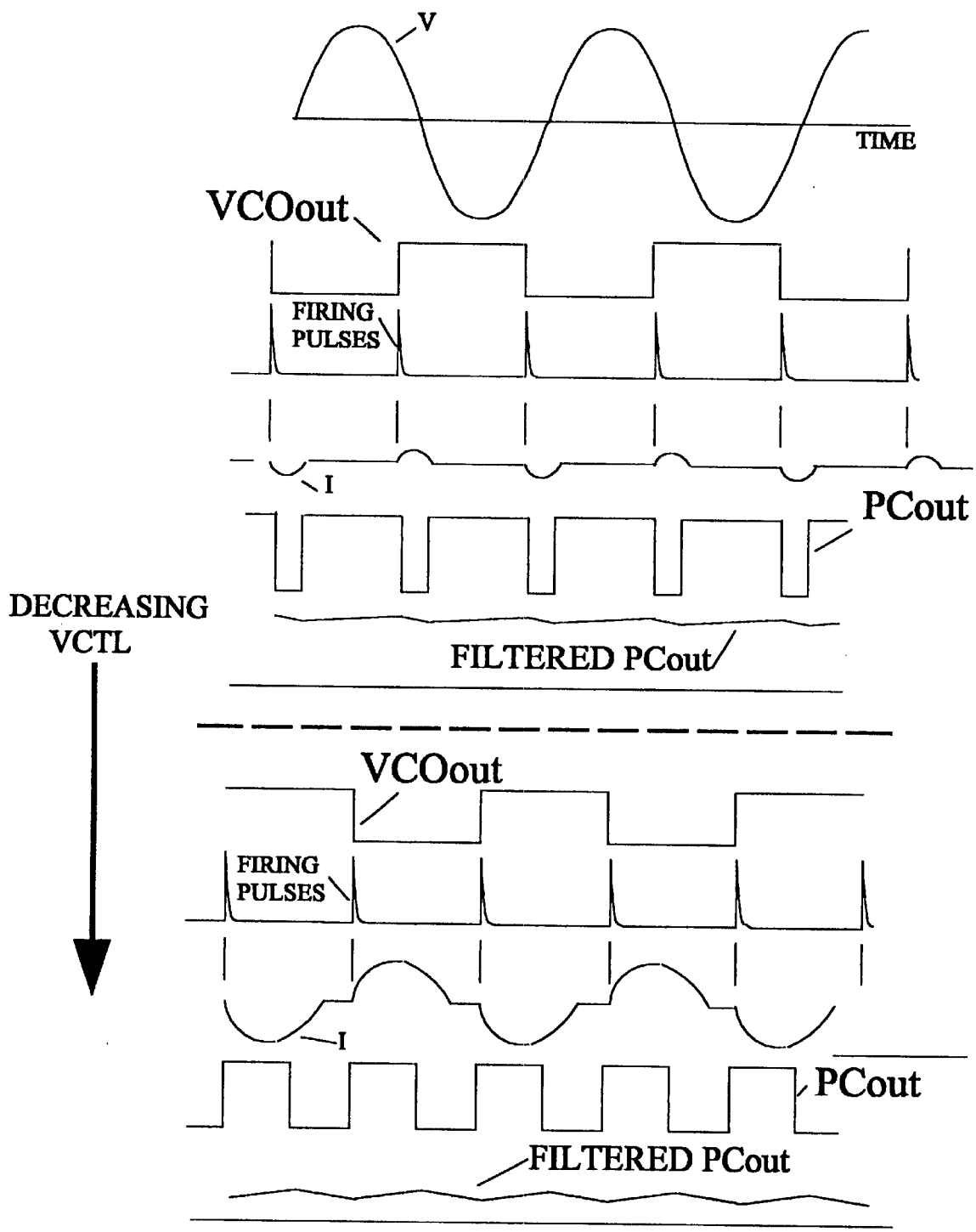
FIG. 4 shows the effect of varying control signal on motor current and on several significant voltages in the control.
Figure 5:
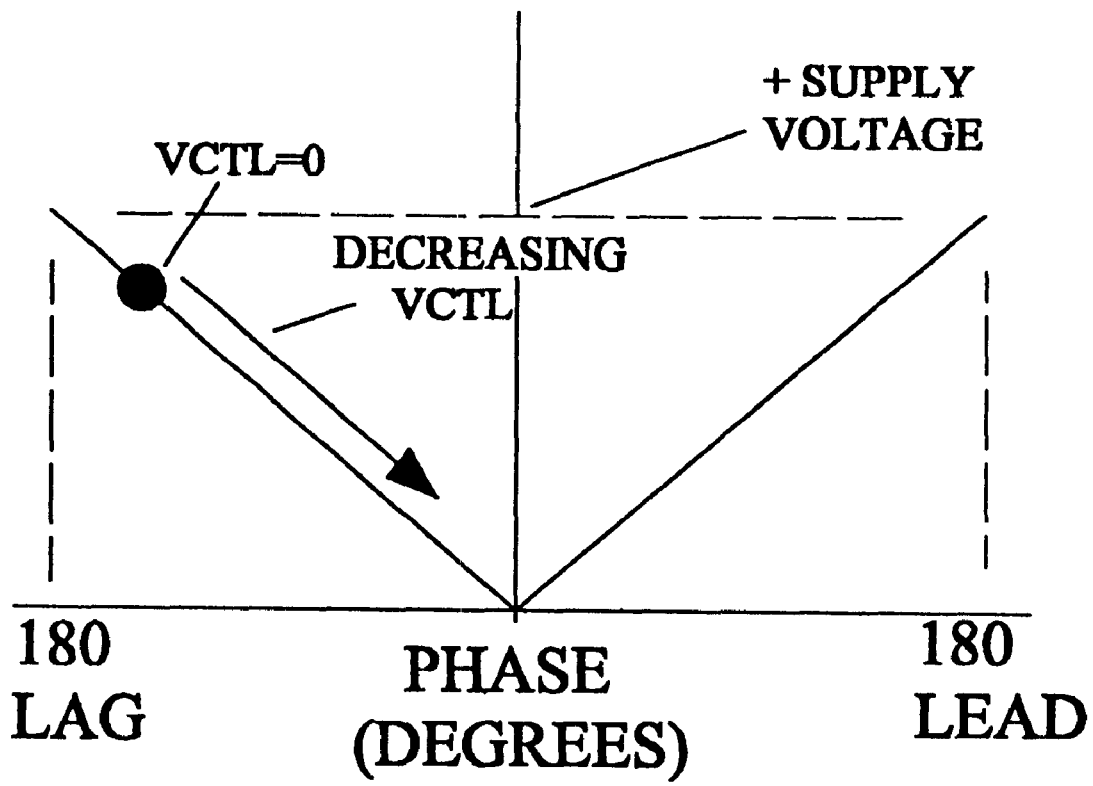
FIG. 5 shows the characteristic of the phase detector in the invention, and illustrates how control signal is used to change the phase of a voltage controlled oscillator relative to power line voltage.

Equation 3 shows that VCTL can be used to control the phase of VCOout relative to the AC line, as illustrated by FIG. 5, which shows the DC component of PCout for an X-OR phase comparator. In order for the PLL to be stable, it must operate on the phase lagging portion of the phase comparator characteristic, i.e., on the left in FIG. 4. According to equation 3, the location of the point labeled VCTL=0 in FIG. 5 is determined by the constants K1 and K2. By means which will be described later, K1 and K2 in the invention are made such that for VCTL=0, the phase lag of VCO out relative to V is (180−φ) electrical degrees, where + is a small angle typically less than 15 degrees. Therefore, if VCTL=0, firing pulses generated at the transitions of VCOout by the FIRING PULSE GENERATOR will precede zero crossings of V by a small fraction of the period of V and the amplitude of reciprocation of the motor will be consequently be low. Referring again to FIG. 5 and equation 3, as VCTL decreases, the phase of VCOout increasingly leads V. As a result, firing pulses precede zero crossings of V by a greater fraction of the period of V, and the amplitude of reciprocation consequently increases. The effect of VCTL is further illustrated by FIG. 4, which shows V, VCOout, firing pulses, PCout, filtered PCout, and I for two values of VCTL. The top part of FIG. 4 applies to VCTL close to zero. Decreasing VCTL causes all of the waveforms in the lower part of FIG. 4 to lead their counterparts in the upper part of FIG. 4. In particular, decreasing VCTL causes current (I) to increase because of increasing time during which the Triac is fired. The rounded shape of the pulses of current is a result of motor inductance, which maintains motor current at and after a zero crossing of V.

Returning to FIG. 1, VCTL is the output of an ERROR AMPLIFIER, which amplifies the difference between a first voltage AMEAS, which is proportional to measured amplitude of motor reciprocation, and a second voltage ASET, which is proportional to required amplitude. Decreasing AMEAS decreases VCTL, which constitutes negative feedback, which maintains AMEAS nearly equal to ASET.

Figure 2:
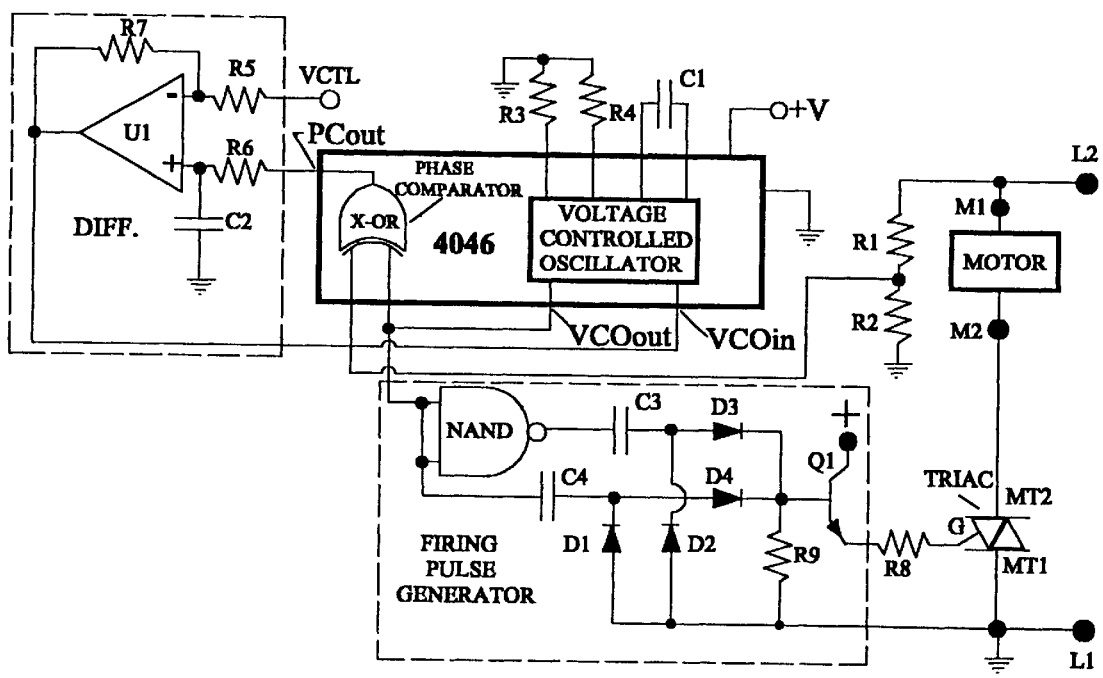
FIG. 2 is a circuit diagram of a preferred embodiment of the invention.

FIG. 2 shows a preferred embodiment of the invention, In which an X-OR phase comparator and VCO are elements of a single CMOS integrated circuit of the generic type number 4046 (Ref. 4). In this embodiment, K1 is determined by resistors R3, R4, capacitor C1, and the positive DC supply voltage (+V). K2 is determined by +V only. R6 and C2 comprise the FILTER element of FIG. 1. The time constant R6×C2 is typically about 0.05 seconds, which is long compared to the period of a 60 Hz. power line, so that the DC component of PCout appears at the + terminal of difference amplifier U1 (DIFF) while the alternating components of PCout are highly attenuated. Resistors R7 and R5 determine the gain of DIFF. Capacitors C3, C4, diodes D1, D2, D3, D4, resistor R9, transistor Q1, and a NAND gate comprise the FIRING PULSE GENERATOR. C4, D1, and D4 form a positive pulse at the base of Q1 when VCOout transitions from ground to +V. The NAND gate, C3, D2, and D3 form a positive pulse at the base of Q1 when VCOout transitions from +V to ground. Q1 is an emitter follower, and R8 controls the peak firing pulse current.

It can be shown that, with typical values for K1, K2, and FILTER time constant R6×C2, a relatively severe line voltage pulse of any amplitude sufficient to produce a false zero crossing of 1 millisecond duration will typically produce only a 2 degree phase disturbance of the phase of VCOout, and that the disturbance will decay exponentially with a time constant of about 25 milliseconds. Such a disturbance has no practical consequence, so that in practice VCOout is isolated from pulses of power line noise.

Figure 3:
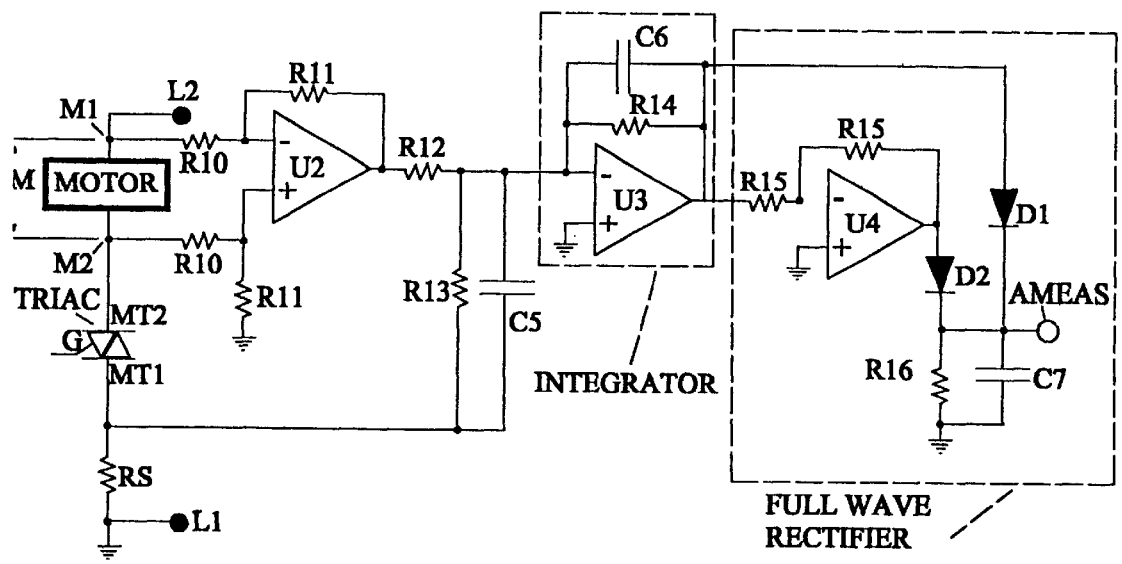
FIG. 3 is a circuit diagram of an electrical analog of a linear motor.

A measurement of reciprocation amplitude of the linear motor, i.e., AMEAS, is necessary for amplitude feedback and can be provided by a position transducer. However, the linear motor itself is an accurate velocity transducer (Ref 3), and is used in one form of the invention to avoid the cost and complexity of a separate transducer. FIG. 3 shows an analog circuit for deriving AMEAS by analog computation based on the equivalent circuit of the motor, which is;

$$\alpha \times v = VM - L \times (dI/dt) - IR \quad \text{equation 4}$$

In equation 4;

α=a constant with units of [volts/(meter/second)]

v=velocity of moving magnets in the linear motor. (meters/second)

L=motor inductance (henrys)

VM=motor voltage (volts)

I=motor current (amps.)

R=motor resistance (ohms)

In FIG. 3, a voltage proportional to current (I) is generated by passing (I) through a low resistance RS, which is typically 0.2 ohms. A voltage proportional to VM appears at the output of difference amplifier U2. The inverting terminal of U3 is a virtual ground and sums the following currents;

$RS \times C3 \times (dI/dt)$, the current through $C3$ $RS/R13 \times I$, the current through $R13$ $[VM \times (R11/R10) \times (1/R12)]$, the current through $R12$.

The sum of the three currents is, with the definition K3= (R11/R10)×(1/R12)

$$K3 \times \{-VM + [(RS \times C3/K3] \times dI/dt + [(RS/(K3 \times R13)) \times I]\}$$

By choosing, $$RS \times C3/K3 = L,$$

$$RS/(K3 \times R13)) = R,$$

it follows from equation 4 that the sum of the three currents is [−K3×α×v], i.e., the sum of the three currents is proportional to motor velocity (v). The INTEGRATOR in FIG. 3 integrates the summed currents, and, since the integral of (v) is motor displacement, it follows that;

$$\text{displacement of moving magnets of linear motor} = K4 \times \text{output of U3,} \quad \text{equation 5}$$

In equation 5, K4 is a constant equal to (K3×α)/C6. R14 is a high resistance that provides a DC feedback path for U3 and has no practical effect on the validity of equation 5. AMEAS is derived from the substantially sinusoidal output of U3 by the FULL WAVE RECTIFIER, which includes an inverter (U4, R15), rectifier diodes D1, D2, and low pass filter R16, C7. The time constant R16×C7 is long compared to the period of V, so that AMEAS is substantially proportional to the peak amplitude of reciprocation.

Although FIG. 3 shows an analog computation of AMEAS, digital computation of AMEAS is also possible and is considered within the scope of the invention.

I claim:

1. An electronic controller for controlling the amplitude of reciprocation of a linear motion permanent magnet motor, the motor having two functionally interchangeable electrical terminals designated here by M1 and M2, the amplitude of reciprocation of the motor designated here by A, the electrical power source for causing reciprocation of the motor being an alternating voltage designated here by V, the power source having two electrical terminals designated here by L1 and L2, the controller comprising the following elements,
   a) a triac having a control gate designated here by G and two main terminals designated here by MT1 and MT2,
   b) a series electrical circuit in which L2 is connected to M1, M2 is connected to MT2, and MT1 is connected to L1,
   c) a voltage controlled oscillator, designated here by VCO, VCO having an input voltage which controls its frequency, the input designated here by VCOin, the VCO having a substantially square wave output voltage designated here by VCOout, VCOout having successively one of two voltage levels, the voltage levels designated here by "high" and "low",
   d) a firing pulse generator which produces a triac firing pulse when VCOout transitions from high to low and also when VCOout transitions from low to high, the firing pulses applied between G and MT1,
   e) a phase comparator having two inputs, one being VCOout and the other being a voltage proportional to power source voltage V, the phase comparator having an output designated here by PCout,
   f) a low pass filter whose input is PCout and whose output is designated here by "filtered PCout",
   g) an amplifier which amplifies the difference between a first voltage designated herein by ASET, the first voltage being proportional to a required value of said amplitude A, and a second voltage designated herein by AMEAS, the second voltage being proportional to a measured value of amplitude A, the amplifier output designated hereafter by VCTL,
   h) a subtracting circuit which subtracts VCTL from filtered PCout, the difference being applied to VCOin for the purpose of controlling the phase of VCOout relative to V.

2. A controller according to claim 1 in which the VCO and the phase comparator are elements of a single integrated circuit.

3. A controller according to claim 1 in which AMEAS is derived by analog or digital computation from the following equation;

$$AMEAS(t) - K \cdot \int_0^t \left( VM(t) - L \cdot \frac{dI}{dt} - I(t) \cdot R \right) dt$$

where K is a constant, VM(t) is the voltage across the motor, L is the motor inductance, I(t) is the motor current, R is the motor resistance, and t represents time.

* * * * *